(12) United States Patent
 Johnson

(10) Patent No.: US 8,014,721 B2
(45) Date of Patent: Sep. 6, 2011

(54) SETTING MOBILE DEVICE OPERATING MODE USING NEAR FIELD COMMUNICATION

(75) Inventor: Phillip Marc Johnson, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 423 days.

(21) Appl. No.: 12/254,552

(22) Filed: Oct. 20, 2008

(65) Prior Publication Data

US 2010/0099354 A1    Apr. 22, 2010

(51) Int. Cl.
*H04B 5/00* (2006.01)
*H04B 7/00* (2006.01)

(52) U.S. Cl. ...................... 455/41.1; 455/41.2

(58) Field of Classification Search ............... 455/41.1, 455/41.2, 41.3, 69, 411, 412.1, 127.4
See application file for complete search history.

(56) References Cited

U.S. PATENT DOCUMENTS

| | | |
|---|---|---|
| 6,122,486 A | 9/2000 | Tanaka et al. |
| 6,832,093 B1 | 12/2004 | Ranta |
| 2002/0039909 A1 | 4/2002 | Rankin |
| 2004/0002305 A1 | 1/2004 | Byman-Kivivuori et al. |
| 2004/0087318 A1 | 5/2004 | Lipovski |
| 2004/0203899 A1 | 10/2004 | Curtis et al. |
| 2005/0170849 A1 | 8/2005 | McClelland |
| 2006/0058018 A1 | 3/2006 | Toulis et al. |
| 2008/0014966 A1 | 1/2008 | Chakraborty et al. |
| 2008/0057876 A1 | 3/2008 | Hsia et al. |
| 2008/0090520 A1 | 4/2008 | Camp et al. |
| 2008/0090595 A1 | 4/2008 | Liu et al. |
| 2008/0174405 A1 | 7/2008 | Toorn |

FOREIGN PATENT DOCUMENTS

| | | |
|---|---|---|
| EP | 1 761 093 A1 | 3/2007 |
| WO | WO 02/13555 A2 | 2/2002 |
| WO | WO 2006/109032 A1 | 10/2006 |

OTHER PUBLICATIONS

International Search Report dated Jul. 27, 2009 issued in corresponding PCT application No. PCT/US2009/043254, 15 pages.
International Preliminary Report on Patentability dated Oct. 29, 2010 issued in corresponding PCT application No. PCT/US2009/043254, 10 pages.

*Primary Examiner* — Eugene Yun
(74) *Attorney, Agent, or Firm* — Snyder, Clark, Lesch & Chung, LLP

(57) ABSTRACT

A mobile communication device is capable of operation in accordance with a plurality of operation mode profiles. Data linking each operation mode profile to a respective operation identifier are stored in the device memory. The device controller, coupled to a contained near field communication (NFC) device, is responsive to operation mode identifier data received from the NFC device during near field communication with an external establishment to change operation from an initial mode to the operation mode linked to the received data.

16 Claims, 4 Drawing Sheets

SETTING MOBILE DEVICE OPERATING MODE USING NEAR FIELD COMMUNICATION

BACKGROUND

The present disclosure is related to mobile communication devices and, more particularly, to changing the operational modes of such devices in response to near field communication (NFC) with external entities.

Mobile communication devices, such as cellular phones, laptop computers, pagers, personal communication systems (PCS), personal digital assistants (PDA), and the like, provide advantages of ubiquitous communication without geographic or time constraints, as well as the added security of being able to contact help in the event of an emergency. Device displays allow users to view and interact with a wide variety of applications, such as contact lists, calendar planners, mapping software, etc.

Advances in technology and services have also given rise to a host of additional features beyond merely voice communication including, for example, short or multimedia messaging, multimedia playback, electronic mail, audio-video capturing, interactive gaming, data manipulation, web browsing, and the like. Other enhancements such as location-awareness features, e.g., global position system (GPS) tracking, enable mobile communication devices to monitor their position and display their location.

The structural design of mobile phones provides compactness of size, incorporating powerful processing functionality within smaller and slimmer phones. The convenience and ease of use of these devices, with their extensive capabilities, have led users to carry them virtually everywhere as constant companions. However, the mobile devices are not compatible with, or their use in some respects are not acceptable in, certain environments. For example, various audible alerts that are often generated by mobile phones, e.g., incoming call and message notifications, are not acceptable in meetings or entertainment venues. Audience members are requested to turn off phones yet, through inadvertence or otherwise, phone users often fail to do so. As another example, signal transmission by mobile devices is not permitted during airplane flights.

As different environments require differing restrictions on mobile phone usage, various operation mode profiles have been developed, a default mode generally set for typical operation. A silent operation mode profile may deactivate audible generation while maintaining other functions active. An Office mode profile may include audible generation deactivation while maintaining calendar and mail features operable. An airplane mode operation may deactivate Radio Frequency (RF) transmission while maintaining other functions. A TTY operational mode may enable communication with a text teletype device as used by the deaf and hard of hearing community. A personal hands-free (PHF) mode may enable voice command capability in lieu of key input and may route audio to a PHF accessory as opposed to the microphone and speaker within the mobile device.

Methods for changing among operational modes exist but typically involve navigating through menus that are not always intuitive and making user interface selections that are not always obvious. The difficulty and confusion in changing such operational modes often leads users to avoid mode changes leading to suboptimal phone operation for atypical environments. A need exists to simplify the manner in which a change in mode of operation may be implemented. Where a particular mode of operation is required by the environment in which the mobile device is located, a convenient and intuitive method for transitioning to the required mode would be beneficial.

SUMMARY OF DISCLOSURE

The above described needs are fulfilled, at least in part, by defining a plurality of device operation mode profiles for a mobile communication device. Data linking each operation mode profile to a respective operation identifier are stored in the device memory. The device controller, coupled to a contained near field communication (NFC) device, is responsive to operation mode identifier data received from the NFC device during near field communication with an external establishment to change operation from an initial mode to the operation mode linked to the received data. The near field communication may be established by placing the mobile device within NFC range of a designated location of an NFC tag in the establishment.

Data originated by the establishment may also be stored in the device memory. Upon detection of near field communication with the establishment, the stored data may be accessed by the controller to ascertain the appropriate operation mode identifier. The controller can then change the mode of operation accordingly. When the user leaves the establishment premises, the mobile device may again be placed for near field communication with an establishment tag. The controller may be responsive to the renewed NFC communication to change or reset the operation mode. The changed mode may be set to a default mode or to the initial operation mode.

Stored establishment originated data may be related, for example, to airplane mode operation. This stored data may comprise airline ticket data. The near field communication thus may be used as check-in flight access authorization as well as imposing airplane mode operation. In other instances, the stored establishment originated data may comprise theater ticket data, wherein near field communication may be used to authorize entry to the theater as well as to change to a silent mode of operation such as, e.g. vibrator mode or cell phone operation disabled.

An office mode operation profile may be activated in response to near field communication to preclude audible notification by the mobile communication device, while maintaining active calendar and messaging functionalities. Such operation is pertinent to meetings, the near field communication established with an NFC device at a designated location of the meeting premises. In office mode operation, any incoming messages may be automatically answered with notice of current unavailability and any other previously stored message, or calendar availability.

Still other aspects, features, and advantages will be readily apparent to those skilled in this art from the following detailed description, wherein preferred embodiments are shown and described, simply by way of illustration of the best mode contemplated. The disclosed concepts are capable of other and different embodiments, with details that entail modifications in various obvious respects. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which.

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with equivalent arrangements. In other instances, well-known structures and devices are shown in block diagram form in order to avoid unnecessarily obscuring exemplary embodiments.

Figure 1:
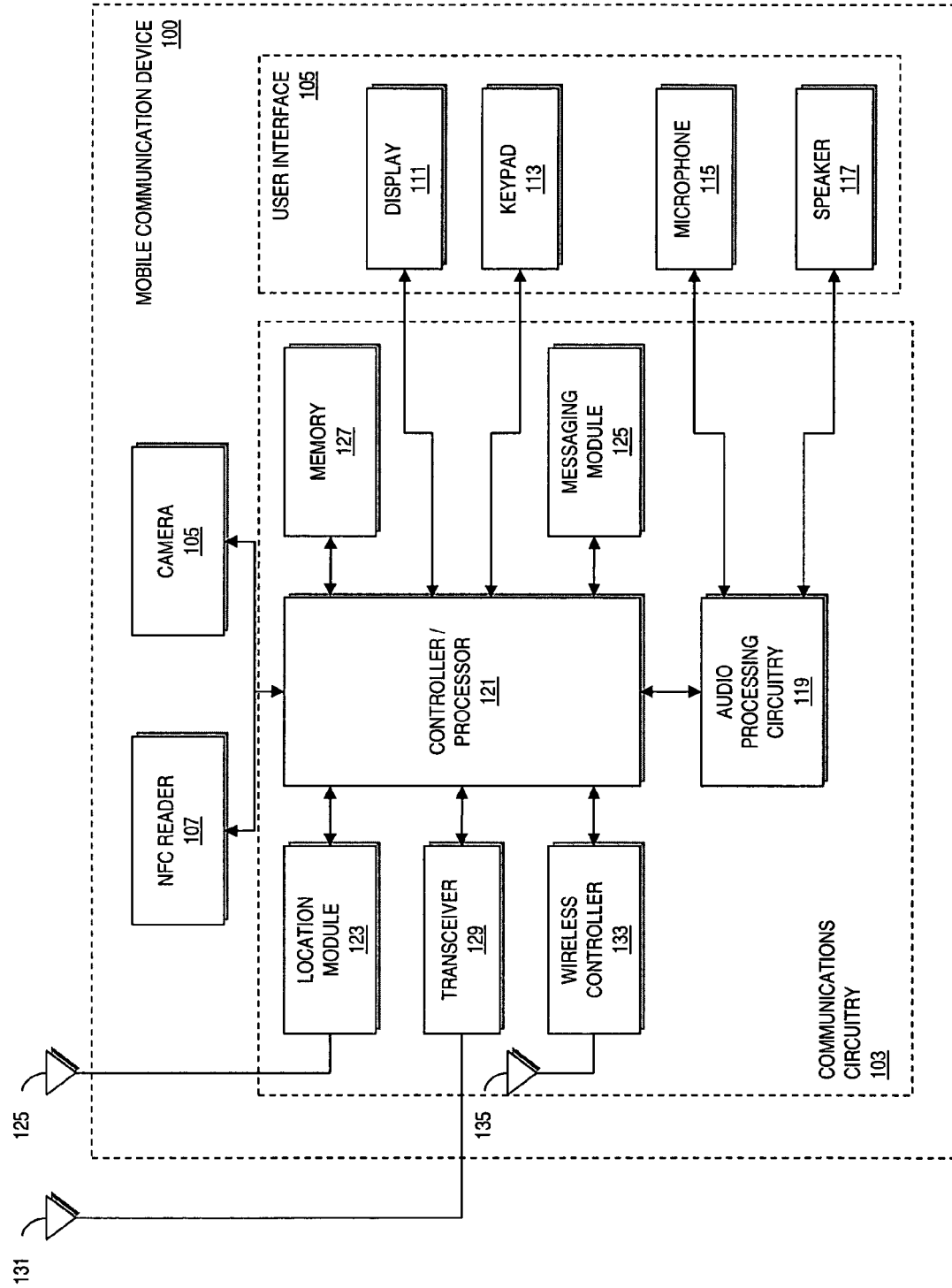
FIG. 1 is a block diagram of an exemplary mobile communication device.

FIG. 1 is a block diagram of an exemplary mobile communication device 100, such as a cellular phone, laptop computer, or the like. Mobile station 100 includes communications circuitry 103 and user interface 105. User interface 105 includes display 111, keypad 113, microphone 115, and speaker 117. Display 111 provides a graphical interface that permits a user of mobile station 100 to view dialed digits, call status, menu options, and other service information. The graphical interface may include icons and menus, as well as other text and symbols. Keypad 113 includes an alphanumeric keypad and may represent other input controls, such as a joystick, button controls, touch panel, dials, etc. The user thus can construct user profiles, enter commands, initialize applications, input remote addresses, and select options from menu systems. Microphone 115 converts spoken utterances of a user into electronic audio signals, while speaker 117 converts electronic audio signals into audible sounds.

Communications circuitry 103 includes audio processing circuitry 119, controller 121, location module 123 (such as GPS receiver) coupled to antenna 125, memory 127, messaging module 125, transceiver 129 coupled to antenna 131, and wireless controller 133 coupled to antenna 135. Memory 127 may represent a hierarchy of memory, which may include both random access memory (RAM) and read-only memory (ROM). Computer program instructions that correspond to various device applications, including location based applications, and corresponding data for application operation can be stored in non-volatile memory, such as erasable programmable read-only memory (EPROM), electrically erasable programmable read-only memory (EEPROM), and/or flash memory. Memory 127 may be implemented as one or more discrete devices, stacked devices, or integrated with controller 121. Memory 127 may store information, such as one or more user profiles, one or more user defined policies, one or more contact lists, etc.

Controller 121 controls the operation of mobile station 100 according to programs and/or data stored to memory 127. Control functions may be implemented in a single controller or via multiple controllers. Suitable controllers may include, for example, both general purpose and special purpose controllers and digital signal processors. Controller 121 may interface with audio processing circuitry 119, which provides basic analog output signals to speaker 117 and receives analog audio inputs from microphone 115.

Figure 2:
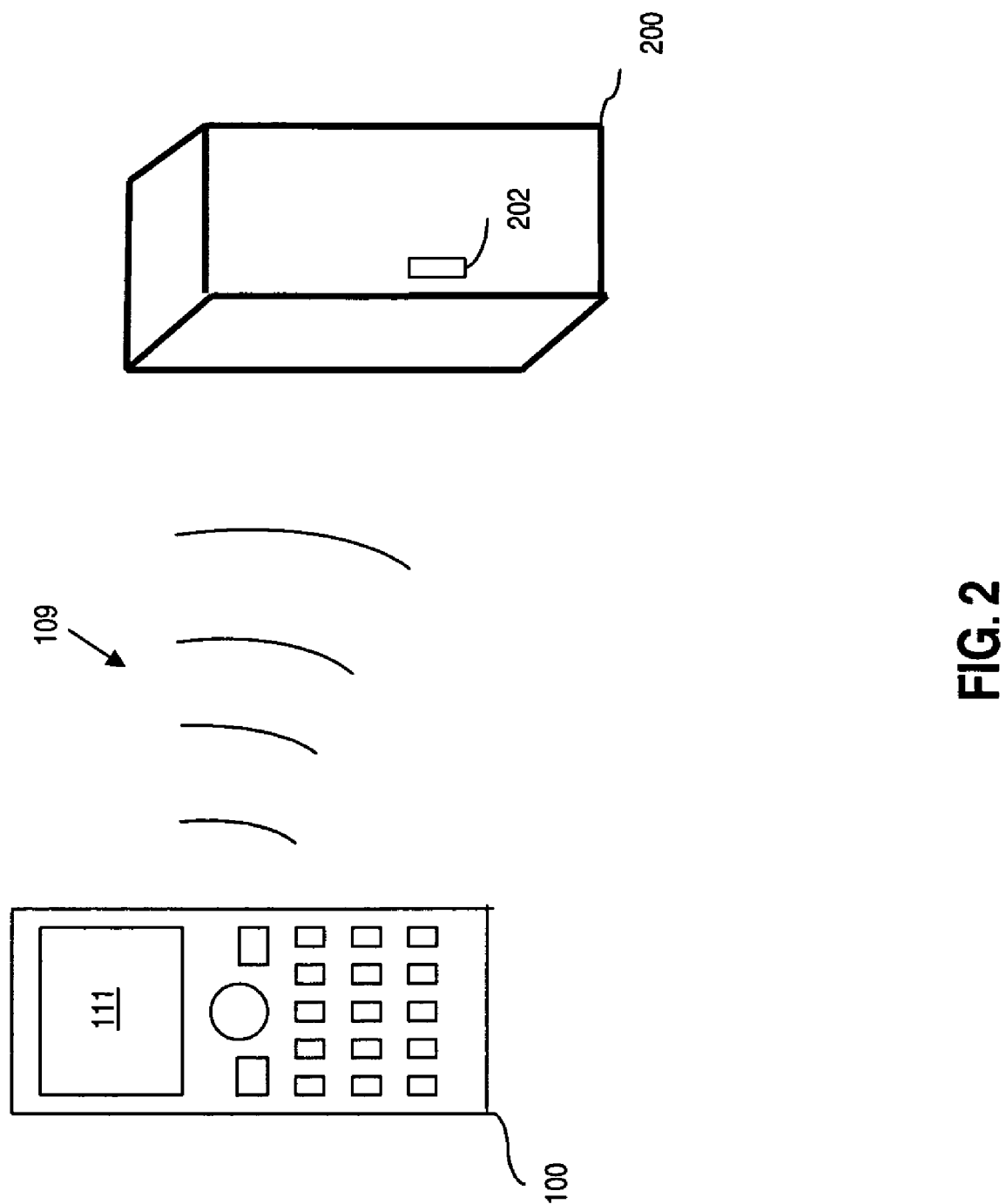
FIG. 2 is an exemplary schematic illustration of near field communication between a mobile communication device and an establishment location.

FIG. 2 is an exemplary schematic illustration of near field communication between a mobile communication device 100 and an establishment location 200 that contains NFC tag 202 at a designated location. Such a designated location is sometimes termed an NFC "landing zone." The mobile communication device 100 is exemplified in this instance as a cellular telephone. Cellular phone 100 contains an NFC device 107, not shown in FIG. 2, but represented in FIG. 1.

The establishment may correspond to various environments and include locations such as airline terminal gates, movie theater entrances, meeting rooms, and the like. The term "establishment" is intended to refer not only to a physical structure of an entity but also locations within the presence of the entity. For example, with respect to an airline entity, the term "establishment" may include a ticket counter, an airplane, and a terminal gateway at either end of a flight.

NFC technology, as well-known to those skilled in the art, combines the functions of a contactless reader, a contactless card, and peer-to-peer communication. The NFC device 107 in cellular phone 100 contains such features. Operating at 13.56 MHz, NFC technology is defined in the ISO 18092 and ISO (International Organization for Standardization) 21481, ECMA (340, 352 and 356) (European association for standardizing information and communication systems) and ETSI TS 102 190 standards. When a device bearing an NFC reader is within range of a second device bearing an NFC tag, the device bearing the reader can obtain information in the tag and implement programmed action. NFC is thus a short-range wireless communication system enabled by positioning two NFC-enabled devices within a range of, for example, 1-10 centimeters of each other. The NFC device 202 may comprise a passive tag or contain all NFC functions.

A user of the mobile phone 100, upon entering the establishment, can swipe the phone in the proximate vicinity of the NFC tag 202, thereby implementing NFC signal communication 109 between the phone 100 and the NFC tag 202. Data contained in tag 202 is thus communicated to the cellular phone 100 via NFC reader 107. The communicated data provide a link to a mobile communication operational mode mandated by the establishment. Controller 121, in response to receipt of NFC data, can then automatically impose the mandated operational mode.

Figure 3:
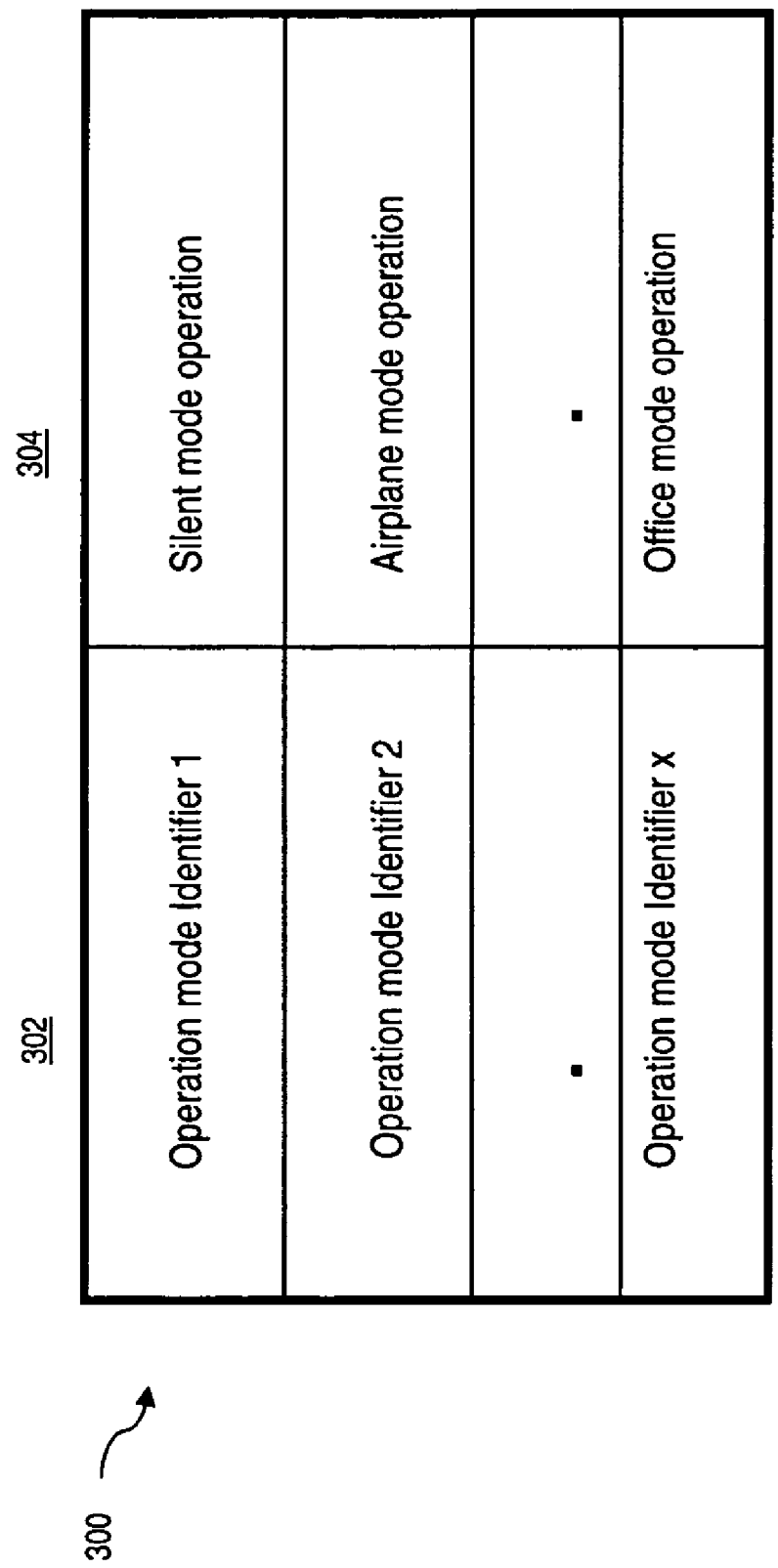
FIG. 3 is a table representing a database accessed during operation of the mobile telephone of FIG. 2.

The received NFC communication data may be linked to data stored in the mobile device. For example, a database may be stored in memory 127 that relates a plurality of operation mode profiles with respective identifiers. Controller 121, in response to receipt of the NFC communication data that contains one of the identifiers, will then implement the related operation mode profile. An exemplified database is illustrated in FIG. 3. Database 300 is represented by a table including a plurality of different identifiers 302 that are linked to respective operation mode profiles 304. In the illustrated example, a first identifier is linked to a silent mode operation. As the silent mode deactivates audible notification, such mode is appropriate for theater venues. Upon entering a theater, a mobile user need only swipe the phone in the vicinity of an NFC tag at the entrance to automatically disable audible notification. The user need take no action in response to the normal announcement, which is often forgotten, asking that phones be turned off.

FIG. 3 further exemplifies identifiers linked to airplane mode and office mode profiles. An airline ticket holder may establish NFC communication, for example, at a terminal gateway upon embarking to automatically disable the RF transmission capability of the phone. In the airplane mode, other features of the phone may be active. The office mode may be activated, for example, upon NFC communication initiated at an entrance to a meeting area. The office mode profile may impose silent mode restrictions as well as limiting phone usage to calendar and email message receipt functionality. The office mode profile also may contain an automatic response function to incoming messages or calls, indicating user unavailability, etc.

The controller may be configured to change the phone operational mode, either by a detected condition or by user input, after interaction with the establishment. For example, when a user leaves the establishment premises, or disembarks from a flight, the mobile device may be placed in NFC communication with an establishment NFC tag. As the establishment may contain a plurality of tags in different locations, the new NFC communication need not include phone interaction with the same tag used earlier. Controller 121 may be preconfigured by default or by the user to change the operational mode in response to this renewed establishment communication. For example, the operational mode may be automatically changed to a default setting or to the operational mode in effect prior to the first NFC communication.

The link between the data received by NFC communication and the associated operation mode profile may be determined by the controller with reference collateral stored data. For example, a user may register with an establishment and receive and store a data communication message that includes an operation mode identifier. A received NFC communication may direct the controller to the stored message for activating the appropriate operation mode.

The stored collateral data may comprise, as further examples, airline ticket data or theater ticket data. A user may purchase an airline ticket or a movie ticket online and download the ticket data to the mobile device. NFC communication at the establishment will effect the change in operation mode as described earlier. The NFC device in the establishment may include a reader with full capability that is coupled to an establishment processor. Establishment of NFC communication can thus also effect authorization to use the purchased ticket that has been stored as data in the mobile device.

Figure 4:
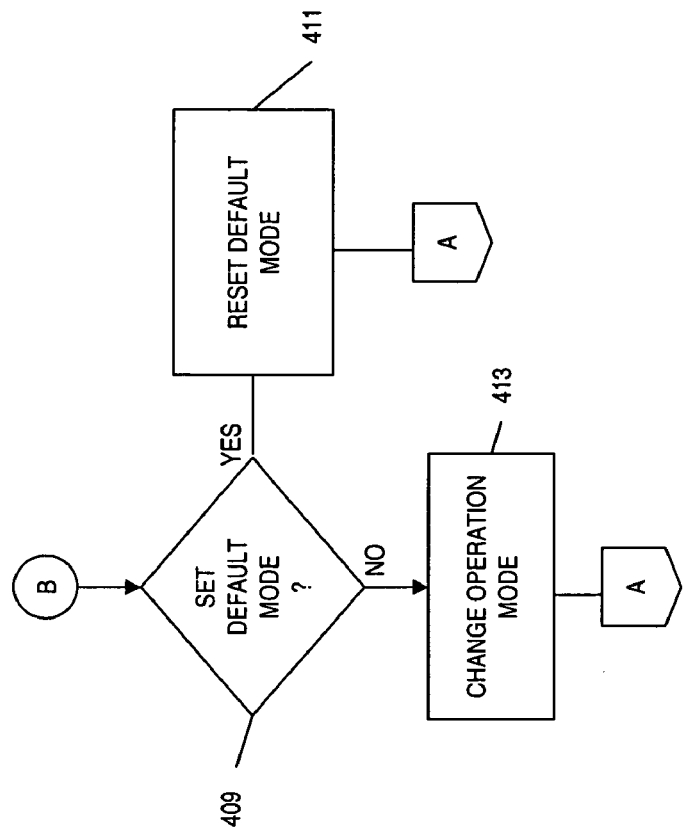
FIG. 4 is a flow chart of operation of an exemplary embodiment.
Figure 4:
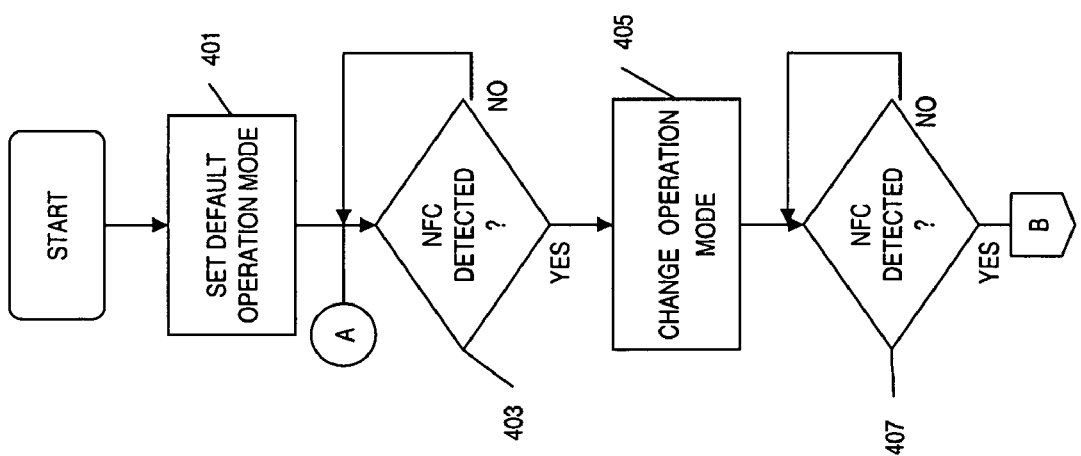

FIG. 4 is a flow chart of operation of an exemplary embodiment. In this embodiment, the mobile device has been configured to be capable of operation in a plurality of modes. Operation mode profiles may be established by the manufacturer and/or by user input in response to menu options or the like. The mobile device, exemplified by a cellular phone, is powered on at the start and a default operation mode is set at block 401. NFC functionality is activated. Although the default operation mode generally provides full communication functionality, a different default mode may be prescribed by the user.

Block 403 determines whether near field communication has been detected by the mobile device controller. While near field communication can be initiated by the user intentionally positioning the mobile device within range of an establishment, it is also possible that spurious near field interaction can take place. If near field communication is detected and an operation mode identifier has been recognized, the controller imposes the corresponding operation mode profile at block 405. The controller may respond directly to the received NFC data or link the received data to stored collateral data to obtain the operation mode identifier link.

The mobile device continues operation in the changed mode until either the user manually selects another operation mode profile or if near field communication is again detected at block 407. Communication may be initiated by the user upon leaving the establishment premises. If near field communication is detected, determination is made at block 409 whether operation of the mobile device is to be changed to the default mode. This determination may be made based on the stored operation mode profile corresponding to the establishment. For example, such profile may provide that a second successive recognition of the identifier requires a change of operation to a specified mode. The specified mode may or may not be the default mode. If a default mode has been specified, the controller will reset default operation and the process flow reverts to block 403.

If a different mode has been specified, the controller will change to the corresponding operation mode profile at block 413. The process flow then reverts to block 403. Detection of NFC at block 407 may occur when the user has interfaced with a different establishment. For example, the user may have neglected, or not have had an opportunity, to re-establish near field communication with a first establishment upon leaving those premises. The operation thus may remain in the mode associated with the first establishment or changed manually by the user. The subsequent NFC detection at block 407 may be initiated by interaction with a different establishment. The change of operation at block 413 would apply the mode associated with the new establishment.

In this disclosure there are shown and described only preferred embodiments and but a few examples of their versatility. It should be appreciated that the disclosure is not so limited but is applicable to various obvious modifications and equivalent arrangements, which fall within the purview of the appended claims. For example, operation mode changes may be appropriate in various other environments, such as restaurants. The setting of phone profiles by the use of near field communication is quick and convenient. The relatively small expense involved in providing near field interaction provides a benefit to establishment proprietors as they have the ability to effect appropriate phone usage in their premises. The phone user is benefited by elimination of the need to remember to change modes and the user input manipulation required to do so. Although features of the claims are expressed in certain combinations, it is contemplated that these features can be arranged in any combination and order.

What is claimed is:

1. A mobile communication device comprising:
   a controller configured to:
     determine a plurality of operation modes of the mobile communication device, and
     receive, based on user registration with an establishment related to a transaction between a user and the establishment, a data message that includes a particular operation mode identifier;
   a memory configured to:
     store the data message that includes the particular operation mode identifier, and
     store data linking ones of the plurality of operation modes, to a respective operation mode identifier; and
   a near field communication (NFC) device, coupled to the controller, to receive an NFC communication from an NFC tag at a location associated with the establishment;
   wherein the NFC communication directs the controller to access the stored data message that includes the particular operation mode identifier, upon receiving the NFC communication, to activate a particular operation mode, of the plurality of operation modes, linked to the particular operation mode identifier.

2. A mobile communication device as recited in claim 1, wherein the memory is configured to store data originated by the establishment.

3. A mobile communication device as recited in claim 1, wherein the controller is further configured to change the particular operation mode, to another operation mode, when the NFC device receives another NFC communication from another NFC tag at another location associated with the establishment.

4. A mobile communication device as recited in claim 3, wherein the the operation mode is a default operation mode of the plurality of operation modes of the mobile communication device.

5. A method comprising:
   determining a plurality of operation modes for a mobile communication device;
   storing a data message, in a memory of the mobile communication device, related to an a transaction between a user of the mobile communication device and an establishment with which the user has registered, wherein the data message includes a particular operation mode identifier corresponding to one of the plurality of operation modes;
   detecting near field communication (NFC) between the mobile communication device and an NFC tag at a location associated with the establishment; and
   in response to the detection of the NFC communication:
      accessing the stored data message, and
      setting an operation mode of the mobile communication device, that differs from a current operation mode of the mobile communication device, and corresponds to the particular operation mode identifier stored with the data message.

6. A method as recited in claim 5, wherein setting an operation mode of the mobile communication device comprises changing from a default operation mode to an operation mode determined by the establishment.

7. A method as recited in claim 5, wherein the mobile communication device comprises an NFC device, and detecting the NFC communication comprises positioning the mobile communication device within NFC range of a designated location of multiple NFC tags located at different locations associated with the establishment.

8. A method as recited in claim 7, further comprising resetting the current operation mode of the mobile communication device in response to positioning the mobile communication device within NFC range of the designated location of another NFC tag located at a another one of the different locations.

9. A method as recited in claim 8, wherein resetting the current operation mode of the mobile communication device comprises activating a default operation mode.

10. A method as recited in claim 8, wherein resetting the current operation mode of the mobile communication device comprises activating an initial operation mode of the mobile communication device in effect prior to the detection of the NFC communication.

11. A method as recited in claim 5, wherein the particular operation mode identifier stored with the data message corresponds to an airplane mode of operation that precludes the mobile communication device from transmitting radio frequency transmission.

12. A method as recited in claim 11, wherein the stored data message comprises airline ticket data, and the method further comprises:
   automatically authorizing, based on the airline ticket data, the user of the mobile communication device to flight access.

13. A method as recited in claim 5, wherein the particular operation mode identifier stored with the data message corresponds to a silent mode of operation that precludes audible notification to be presented by the mobile communication device.

14. A method as recited in claim 13, wherein the silent mode comprises an office mode of operation and the stored data message comprises calendar application data.

15. A method as recited in claim 14, further comprising:
   generating an automatic response notification to messages received, at the mobile communication device, during the office mode of operation.

16. A method as recited in claim 5, wherein the stored data message comprises event ticket data, and the method further comprises:
   automatically authorizing, based on the event ticket data, the user of the mobile communication device to event access.

* * * * *